United States Patent
Taylor et al.

(10) Patent No.: US 7,433,066 B1
(45) Date of Patent: Oct. 7, 2008

(54) METHOD OF AND APPARATUS FOR CONTROLLING THE PRINTING OF DOCUMENTS FROM A COMPUTER

(75) Inventors: Richard Taylor, Bristol (GB); Jason James Brown, Palo Alto, CA (US); Maher Rahmouni, Boise, ID (US); Tarek Ben-Ismail, Grenoble (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/521,663

(22) Filed: Mar. 8, 2000

(30) Foreign Application Priority Data

Mar. 8, 1999 (EP) ................................. 99301711

(51) Int. Cl.
*G06F 15/00* (2006.01)
*G03G 15/00* (2006.01)

(52) U.S. Cl. ........................................ 358/1.15; 399/38

(58) Field of Classification Search ......... 358/1.1–1.13, 358/1.15, 1.14, 1.16, 1.18; 399/38; 709/223, 709/202, 246; 379/221.08, 201.01; 707/100, 707/1, 3

See application file for complete search history.

(56) References Cited

U.S. PATENT DOCUMENTS

| | | | | |
|---|---|---|---|---|
| 5,319,748 A | * | 6/1994 | Motoyama | 345/501 |
| 5,469,532 A | * | 11/1995 | Gerlach et al. | 358/1.2 |
| 5,469,533 A | * | 11/1995 | Dennis | 358/1.15 |
| 5,596,416 A | * | 1/1997 | Barry et al. | 358/296 |
| 5,678,133 A | * | 10/1997 | Siegel | 399/67 |
| 5,696,984 A | * | 12/1997 | Nagata et al. | 358/1.11 |
| 5,699,495 A | * | 12/1997 | Snipp | 358/1.15 |

FOREIGN PATENT DOCUMENTS

| EP | 0 538 059 A2 | | 4/1993 |
|---|---|---|---|
| EP | 538059 A2 | * | 4/1993 |

* cited by examiner

Primary Examiner—Saeid Ebrahimi Dehkordy

(57) ABSTRACT

Signals representing a document are supplied by a computer to a printer having a printer processor. The computer supplies to the printer processor (1) instruction data (such as page description language) and (2) resource information indicative of printer processor resources required by the printer at different document printing stages. The printer processor schedules printer processor resources for the different document printing stages in accordance with the resource information, and causes the printer to print the document with the printer processor resources as scheduled. The resource information is provided as comments in page description language located in page headers so the printer learns, in advance of receiving pages of a job, how its resources should be scheduled to prevent printer stalls.

38 Claims, 2 Drawing Sheets

METHOD OF AND APPARATUS FOR CONTROLLING THE PRINTING OF DOCUMENTS FROM A COMPUTER

RELATED APPLICATIONS

The present application is based on, and claims priority to European Application Serial Number 99301711.0, filed Mar. 8, 1999, the disclosure of which is hereby incorporated by reference herein in its entirety.

STATEMENT REGARDING FEDERALLY SPONSORED RESEARCH OR DEVELOPMENT

None

INCORPORATION-BY-REFERENCE OF MATERIAL SUBMITTED ON A COMPACT DISC

None

BACKGROUND OF INVENTION

1. Field of Invention

The invention relates to an improved method of printing documents with a printer from a computer, and to apparatus and systems adapted for use of this approach. In particular, the invention relates to more efficient use of processor resources in the printing of documents.

2. Background Art

A conventional printing process from a computer is rendered schematically in FIG. 1. The document is generated on computer 8—this may be for example a personal computer, a workstation, or substantially any other device with a processor on which documents may be held or processed and which are connectable with a printer for producing a hard copy of the electronically held document. Typically, the document will be generated by an application 1, such as a word processing program or a spreadsheet. The document will generally be provided by the application 1 in a printer independent form 5.

This printer independent form of the document 5 is sent to a print driver 2. The print driver 2, which is typically customised to a particular model or make of printer, takes this printer independent form of a document and converts it into a printer specific page description 6 which conforms to the printer's page description language (PDL). The printer driver 2 may also add information about the job (of printing the document), such as for example the number of copies, binding options or duplex options. This job information is provided in a job control language (JCL). In common page description languages such as Postscript (a Registered Trade Mark of Adobe Systems Incorporated), certain job information is mixed into the description of a page, as will be described further below.

The printer specific page description 6 (including any job information) is then sent to print spooler 3. The print spooler 3 is a mechanism for handling communication between the computer 8 and the printer 9 which is responsible for printing the print job. The printer specific page description is sent at the appropriate time from the print spooler 3 according to whatever protocols apply to the transport connection 7 between the computer 8 and the printer 9, and is received by the printer processor 4. The printer processor 4 observes the stream of PDL and JCL that it receives from the print spooler 3, and controls the printer to generate printed pages accordingly.

It should be noted that certain of the resources associated with the computer (in particular the print spooler 3) may not themselves be a physical part of the computer 8, but instead a part of a computer network to which both the computer 8 and the printer are attached. For convenience, throughout this specification such components associated with the computer and not specifically a part of the printer will be referred to as "of the computer".

A difficulty in conventional printing systems of this type is that the demands on the printer processor 4 can be very heavy at certain times, and very light at others. For example, consider a print job in which 1 in every 20 pages require a group of unusual fonts to be synthesised together. This synthesis results in a computational load too great for the printer processor to complete within the time normally allocated to the processing of a single page. If the fonts are not already present (for example, held in a cache on the printer) the result will be that the printer stalls (the paper feed pipeline is halted while the printer processor synthesises the necessary characters, and then restarted thereafter). Such stalls can be very expensive in resource consumption for typical modern printers: such a pipeline may be many pages long, and a printer drum may need to be brought back up to temperature before paper can again be fed through the marking engine of the printer. Such circumstances could lead to a halving of print capacity. Situations of this general type (areas which require high consumption of resources scattered among areas which are not so computationally demanding) are common.

A mechanism for improving printer performance has been proposed by Peerless Systems (The Hard Copy Observer, September 1998, page 39) which involves deciding whether to render a page on a personal computer and then send it to the printer in TIFF format as an alternative to sending a page to the printer in the normal manner. This allows particularly complex pages to be processed by the personal computer rather than the printer, balancing the load between the two—however, this means that the overall complexity of print processing increases somewhat (with the personal computer taking on a significant additional processing load). An effective improvement to printer performance is provided, but only by shielding the printer from "difficult" pages.

It would be desirable instead to improve the use of processor resources by the printer itself to improve printer processor effectiveness and so prevent stalling and possibly also increase printing speed.

BRIEF SUMMARY OF THE INVENTION

Accordingly, the invention provides a method of printing a document from a computer with a printer, the printer having a printer processor, the method comprising: generating in the computer instruction data to enable the printer to print the document; generating in the computer resource information indicative of printer processor resources required by the printer at different stages of printing the document; sending the instruction data and the resource information from the computer to the printer; scheduling printer processor resources for the different stages of printing the document in accordance with the resource information; and printing the document with the printer processor resources as scheduled.

The present inventor has appreciated that the problem of excess computational load on the printer processor can generally be removed by allowing printer processor resources to be scheduled appropriately to the demands of a specific print job. For example, in the case indicated above (of 20 normal pages followed by 1 page with complex characters), a stall could be prevented by allowing the generation of the complex characters over the course of the preceding 20 normal pages.

Preferably, the instruction data is provided as PDL and/or JCL and the resource information is provided as annotation to the page description language and/or job control language, and wherein the method comprises after the step of generating resource information the step of annotating the instruction data with the resource information.

To enable printer processor resources to be scheduled appropriately, there must be a mechanism by which the printer processor can be provided with information which can provide an indication of the printer processor resources required by the printer at future stages of printing the document. The present inventor has realised that this information is essentially available from the PDL and JCL, although it is not provided by the PDL and JCL in a form which allows the printer processor to schedule its resources in advance. It is however possible either to change the way in which the PDL and JCL are generated, or to add an additional stage at the computer (or possibly elsewhere in a computer network of which the computer is a part) in which the PDL and JCL is filtered for the information which would be needed to determine effective printer processor resource allocation, and for this filtered output to be provided to the printer processor at least in part temporally in advance of the pages to which it relates. The first of these approaches can be realised by modification of the printer driver, and the second by either modification of the print spooler or by adding an extra software package which takes the output of the printer driver, analyses it for resource information and then annotates it accordingly.

A particularly effective form of annotation is by comments in the PDL, particularly at the head of each printed page. Different approaches to this are possible, depending on desired system performance: providing all resource information on the first page header; providing resource information as it is generated on the next available page header; and preventing any resource information from appearing on the first page header (and desirably not even analysing the first page for resource information) each have their advantages, as later discussion indicates.

The invention further provides printers, computers, computer systems, and software adapted to provide elements necessary to performance of the methods indicated above.

BRIEF DESCRIPTION OF THE DRAWING

Embodiments of the invention will now be described, by way of example, with reference to the accompanying drawings, in which:

FIG. 2 shows a typical arrangement for printing from a computer. Personal computer 8 has a processor 13 and a memory 12 (in both cases there may be a number of components involved—the "processor" may include a main microprocessor and coprocessors, for example, and there may be several different forms of memory). Communication is established with a printer 9 through a network connection 11. The printer 9 also has a processor 14 for control of the printer and a memory 15 for use by the processor.

DETAILED DESCRIPTION OF THE DRAWING

Figure 2:
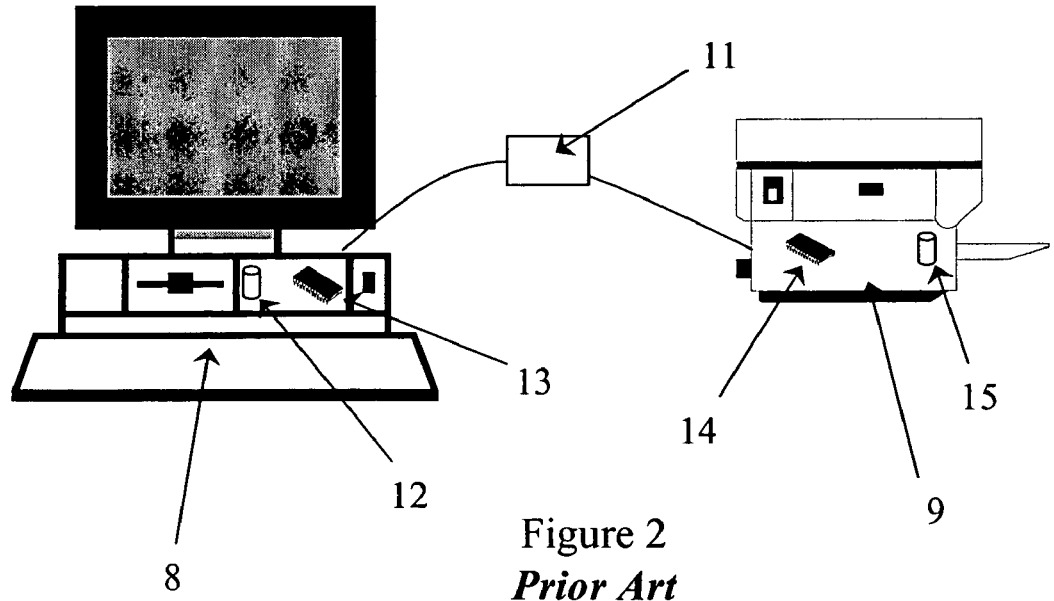
FIG. 2 illustrates a typical arrangement of computer and printer to which the present invention is applicable.

Embodiments of the present invention can be employed for use with the arrangement shown in FIG. 2—the skilled man will readily understand that the present invention can also be employed in other embodiments to other forms of connection between a computer and a printer using the principles set out herein. Embodiments of a printing process according to the present invention are now described with reference to FIG. 3.

Figure 1:
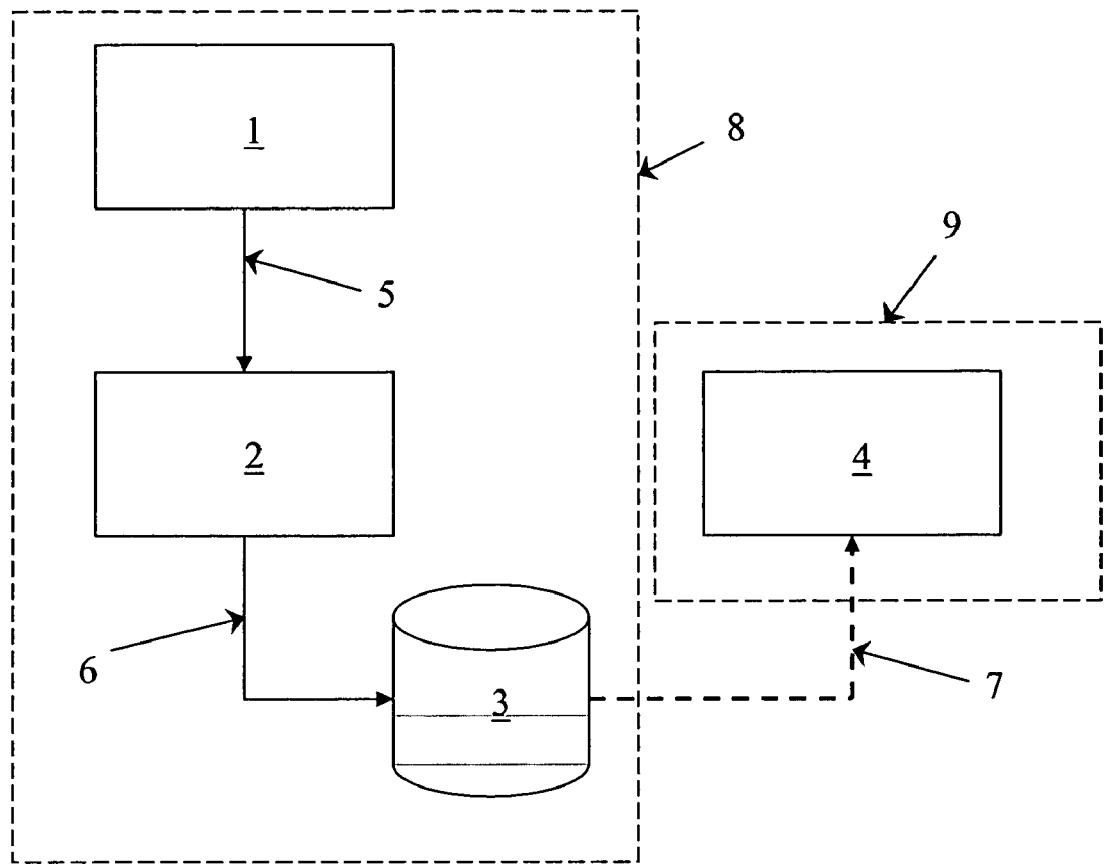
FIG. 1 shows schematically the processing of information for printing of a document by a printer from a computer in a conventional arrangement.

The initial stage of the process is (typically) as shown in FIG. 1: an application 1 generates a printer independent form 5 of a document (one or more pages) to be printed. This printer independent form of the document is passed to the printer driver 2. At this point, there is a difference from the conventional printing process. The printer driver constructs PDL and JCL to pass to the printer 9, but also while constructing the PDL identifies information that would affect how the printer 9 allocates its resources, and writes this information to a table 31. This is not a particularly onerous task, as particular PDL and JCL instructions produced by the printer driver 5 in conventional languages can be identified in advance as having such resource implications—however, in conventional languages such instructions are merely embedded into the stream at the point at which their significance arises in the document, allowing no possibility of advance management of printer resources. Information that affects resources in such a way would include use of a new font (its type, size, and required characters) or of bitmapped graphics (dimensions, depth, colour scheme, file type, manipulations).

The printer specific page description 6 produced by the printer driver 2 does not contain any of the resource information provided in table 31 except as PDL or JCL instructions embedded within the page description in the conventional way. Resource annotation stage 32 provides a mechanism for adding this resource information into the page description in a way that will allow the printer 9 to allocate resources effectively. An effective mechanism is to provide the resource information held in table 31 as comments (such comments are hereafter referred to as "resource declaration") in page headers of the PDL pages. The comments may relate to the page on which they are provided as headers, or, more advantageously, may relate to later pages, in which the printer processor has more time to allocate its resources. Different strategies can be used according to the desired objective. The following approaches will be advantageous in different situations.

(i) Resource declarations for the whole document are provided on the first page of the document. This provides the maximum assistance to the printer 9 in allocating its resources, as a full timetable can be constructed before commencement of the job. Disadvantages are that the job cannot be sent to the printer until all the resource declarations have been added, and that the first page of the document may print slowly (though subsequent pages will be provided with a minimum likelihood of stalls).

(ii) Resource declarations are provided incrementally. In this case, pages are passed to the printer as soon as this is possible, with resource declarations added to the header of the first available page. Provided the analysis to achieve page declarations is sufficiently rapid, this should generally be of comparable effectiveness to method (i) (though the risk of stalls would be at least marginally greater) and printing would commence, and probably finish, more quickly.

(iii) As either method (i) or method (ii), but adapted such that either no resource declarations are provided on the first page of the document or the first page of the document is not analysed for resource declarations or (preferably) both. This maximises the speed of printing the first page of the document (an important metric for evaluation of printers), although it may increase the risk of a stall if the first or second page of the document is particularly complex.

Essentially, the resource information is provided as a separate logical channel to the print data (provided by the conventional PDL without annotations), and use of resource declarations is simply a mechanism to allow effective combination of these two logical channels on to a single transport link 7 for communication to the printer 9. Methods (i) to (iii) above merely form alternative types of this basic mechanism.

Table 1 shows for one Postscript example resource information determined by print driver 2 and written to table 31 (in this case, font information), together with the main features of the PDL itself.

TABLE 1

| Resource Channel | Data Channel |
| --- | --- |
| page1:cmr@10,3; | %!PSAdobe-3.0 |
| page1:cmi@10.4; | %%pages:N |
| page2:cmi@10.1; | %%EndComments |
| page3:cmr@10.3; | %%Page1 |
| page4:cmr@10.34 | . . . |
| . . . | %%Page2 |
| pageN:cmr@11.3 | . . . |
|  | %%Page3 |
|  | . . . |
|  | . . . |
|  | %%PageN |

When integrated into commented PDL by the resource annotation stage, the result could be as shown in any of the three columns in Table 2, depending on the method employed.

TABLE 2

| Initial Declarations (Method i) | Incremental Declarations (Method ii) | Fast Page One (Method iii, here as modification to Method ii) |
| --- | --- | --- |
| %!PSAdobe-3.0 | %!PSAdobe-3.0 | %!PSAdobe-3.0 |
| %%pages:N | %%pages:N | %%pages:N |
| %BeginResourceDeclarations | %BeginResourceDeclarations | %%Page1 |
| %Resource page1:cmr@10.3; | %Resource page1:cmr@10.3; | . . . |
| %Resource page1:cmi@10.4; | %Resource page1:cmi@10.4; | . . . |
| %Resource page2:cmi@10.1; | %Resource page2:cmi@10.1; | . . . |
| %Resource page3:cmr@10.3; | %EndResourceDeclarations |  |
| %Resource page4:cmr@10.34; | %%EndComments |  |
| %Resource . . . | %%Page1 |  |
| %Resource pageN:cmr@11.3 | . . . |  |
| %EndResourceDeclarations | . . . |  |
| %%EndComments | . . . |  |
| %%Page1 |  |  |
| . . . |  |  |
| . . . |  |  |
| . . . |  |  |
| %%Page2 | %%Page2 | %%Page2 |
| . . . | %BeginResourceDeclarations | %BeginResourceDeclarations |
| . . . | %Resource page3:cmr@10.3; | %Resource page2:cmi@10.1; |
|  | %EndResourceDeclarations | %Resource page3:cmr@10.3; |
|  | . . . | %EndResourceDeclarations |
|  | . . . | . . . |
|  |  | . . . |
| %%Page3 | %%Page3 | %%Page3 |
| . . . | %BeginResourceDeclarations | %BeginResourceDeclarations |
| . . . | %Resource page4:cmr@10.34; | %Resource page4:cmr@10.34; |
|  | %Resource . . . | %Resource . . . |
|  | %Resource pageN:cmr@11.3 | %Resource pageN:cmr@11.3 |
|  | %EndResourceDeclarations | %EndResourceDeclarations |
|  | . . . | . . . |
|  | . . . | . . . |
| %%PageN | %%PageN | %%PageN |
| . . . | . . . | . . . |
| . . . | . . . | . . . |

The resource annotation stage 32 may be a part of the printer driver itself. Other possible locations in the pipeline are possible, and table 31 can be compiled by components other than the printer driver. The resource table 31 could for example be compiled by the application 1 (in the case of certain applications which generate the PDL directly) or by the print spooler 3, or by some resource filter sitting between the application 1 and the printer driver 2, the printer driver 2 and the print spooler 3, or the print spooler 3 and the printer 9. The resource annotation stage obviously cannot be any earlier in the pipeline than the point at which the resource table 31 is compiled, but it can sit either in the same component or at a later stage.

Figure 3:
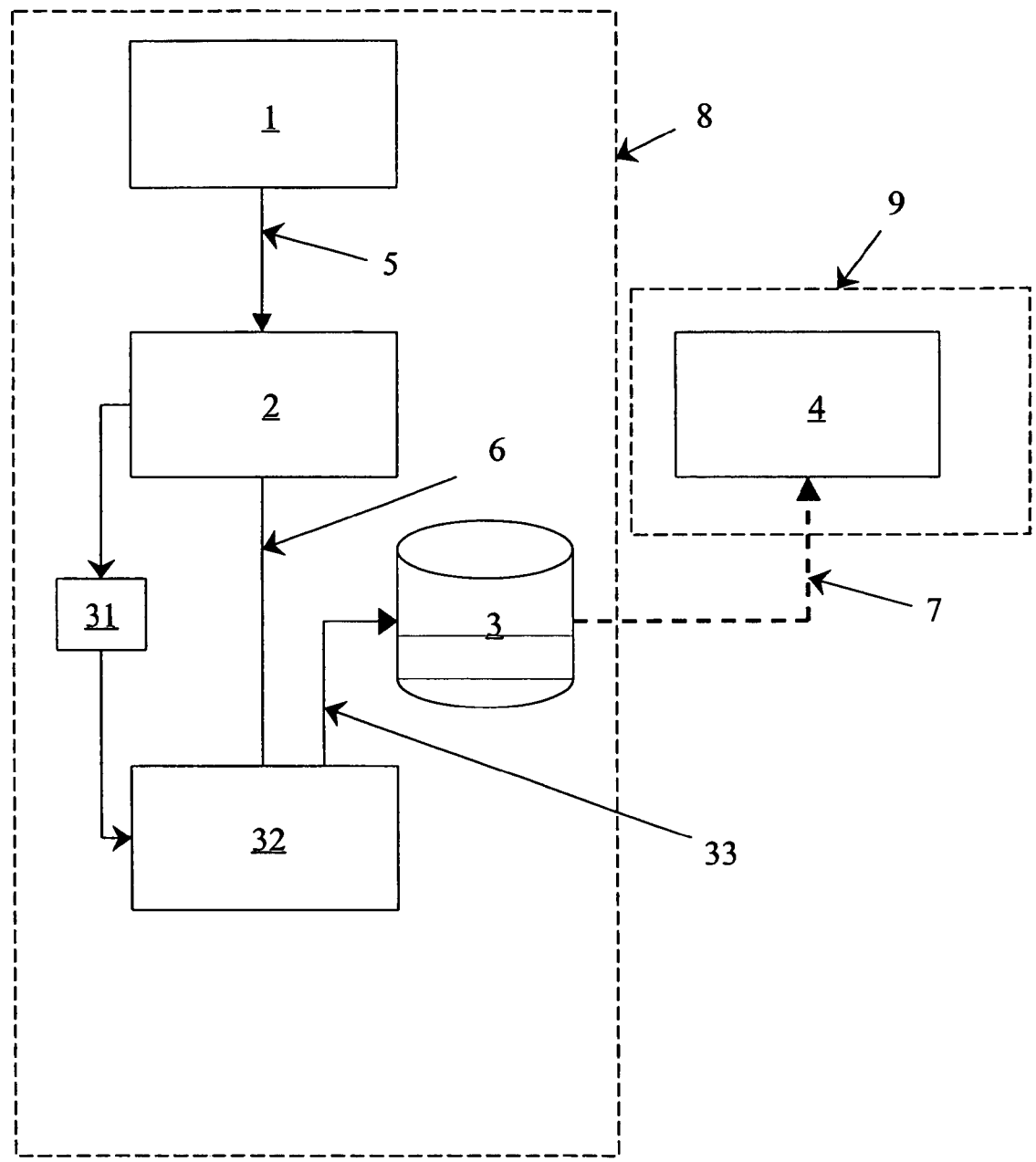
FIG. 3 shows schematically the processing of information for printing of a document by a printer according to embodiments of the present invention.

In the FIG. 3 example, the resource annotated page description 33 is sent to the print spooler 3 and then out on to the transport connection 7 to the printer 9. The resource annotated page description is received by the printer processor 4, which is adapted to recognise which of the comments in the annotated PDL are resource declarations. The resource declarations are extracted, and processing of the appropriate tasks is scheduled so that when the page to which they relate is to be printed, the task will be sufficiently completed to prevent the possibility of a stall. Although the difference to the printer processor is significant in practice, significant redesign is not required. The tasks for which resources are to be allocated are not different from those required normally— the difference is only that advance notice is given, allowing the printer processor 4 to schedule tasks earlier, and more conveniently, than is possible with conventional printing approaches An advantage of using commented Postscript (or comments in any other language recognised by the printer) is that if the printer is not enabled to handle resource allocation according to the present invention, the print job can still be processed in the normal way—the substance of the PDL as seen by the printer is unaffected and the comments are (like other comments) simply ignored. Embodiments of the invention can thus be provided to ensure backward compatibility with existing printers.

In the embodiments described above, the two logical channels—resource channel and data channel—are combined into one unified channel of annotated data. With a printer structure adapted appropriately, these two logical channels could be kept entirely separate—the data channel provided directly to the printer in the conventional way, and the resource channel provided separately (possibly on the same physical wire, but as a different stream of packets) and received and interpreted by a specifically adapted part of the printer—possibly a separate processor in the printer, or possibly as a separate activity within the existing printer processor.

The invention claimed is:

1. A method of printing a document from a computer with a printer, the printer having a printer processor that is not in the computer, the method comprising:
   generating, in the computer, instruction data sufficient to cause the printer to print plural pages of the document, the instruction data comprising instruction data required to print a current page and at least one subsequent page, printing of the subsequent page requiring printer resources different from the printer resources required to print the present page;
   generating, in the computer, by derivation from the computer generated instruction data required to print the at least one subsequent page, resource information indicative of printer processor resources required by the printer to print at least one subsequent page, the resource information required to print the at least one subsequent page being different from the resource information required to print the current page;
   sending, on the current page, the instruction data required to print the current page to the printer processor together with the resource information indicative of printer processor resources required by the printer to print the at least one subsequent page;
   scheduling printer processor resources for printing the current page and at least one subsequent page in accordance with the resource information sent together with the instructional data required to print the current page; and
   printing the document with the printer processor resources determined by the scheduling step.

2. A method as claimed in claim 1, wherein the instruction data is provided as at least one of page description language and job control language.

3. A method as claimed in claim 2, further including annotating at least one of the page description language and job control language, with the resource information; and annotating the instruction data with the resource information after the resource information has been generated.

4. A method as claimed in claim 3, wherein a common information processing structure carries out the steps of generating the instruction data, generating the resource information, and annotating the instruction data with the resource information.

5. A method as claimed in claim 4, wherein the common information processing structure includes a printer driver.

6. A method as claimed in claim 3, wherein a first information processing structure carries out the step of generating the instruction data, and a second information processing structure carries out the steps of generating the resource information and annotating the instruction data with the resource information.

7. A method as claimed in claim 6, wherein said second information structure is located in an information path for instruction data from the first information processing structure to the printer.

8. A method as claimed in claim 7, wherein said second information structure includes a print spooler.

9. A method as claimed in claim 7, wherein said second information structure includes a discrete structure receiving the instruction data as input and providing instruction data annotated with the resource information as output.

10. A method as claimed in claim 3, wherein the annotation is in the form of comments in at least one of the page description language and job control language, and wherein the method comprises between the steps of sending the instruction data and the resource information from the computer to the printer and scheduling printer processor resources a further step of filtering the comments in at least one of the page description language and job control language to extract the resource information needed to determine effective printer processor resource allocation, and supplying the filtered comments to the printer processor in advance of the subsequent page(s) to which filtered comments relate.

11. A method as claimed in claim 10, wherein the document comprises a first page and further pages and wherein the resource information is provided in the form of comments in page headers for the first page and the further pages in the page description language.

12. A method as claimed in claim 11, wherein the resource information is in the form of comments in the page header to the first page of the document.

13. A method as claimed in claim 11, wherein the resource information is provided incrementally in a plurality of page headers.

14. A method of printing a document from a computer with a printer, the printer having a printer processor that is not in the computer, the method comprising:

generating, in the computer, instruction data sufficient to cause the printer to print plural pages of the document, the instruction data comprising instruction data required to print a current page and at least one subsequent page;

generating, in the computer, by derivation from the instruction data required to print the at least one subsequent page, resource information indicative of printer processor resources required by the printer to print at least one subsequent page;

sending the instruction data required to print the current page to the printer processor together with the resource information indicative of printer processor resources required by the printer to print the at least one subsequent page;

scheduling printer processor resources for printing the current page and at least one subsequent page in accordance with the resource information sent together with the instructional data required to print the current page;

printing the document with the printer processor resources as scheduled, forming the resource information as annotation to at least one of the page description language and job control language annotating the instruction data with the resource information after the resource information has been generated;

forming the annotation on comments in at least one of the page description language and job control language;

between the steps of sending the instruction data and the resource information from the computer to the printer and scheduling printer processor resources, filtering the comments in at least one of the page description language and job control language so the resource information is extracted; the document comprising a first page and further pages, forming the resource information as comments in page headers for the first page and the further pages in the page description language; providing the resource information incrementally in a plurality of page headers; the page headers including resource information for the page to which they relate or to later pages in the document if such resource information has not already been provided in previous page headers.

15. A printer adapted to print a document from instruction data sufficient to cause the printer to print plural pages of the document together with resource information derived from the instruction data indicative of printer processor resources required by the printer to print at least some of the plural pages of the document, the resources information for at least one of the subsequent pages differing from the resource information of the current page and being on the current page, the document having a current page and subsequent pages, the printer having a printer processor, the printer processor being arranged to (a) schedule its resources for printing said at least one of the subsequent pages of the document in response to resource information provided with instruction data required to print the current page of the document and on the current page; and (b) print the current and the subsequent pages of the document from the instruction data with the printer processor resources as scheduled.

16. A printer as claimed in claim 15, wherein the instruction data is adapted to be provided as at least one of page description language and job control language.

17. A printer as claimed in claim 16, wherein the resource information is adapted to be provided as annotation to at least one of the page description language and job control language.

18. A printer as claimed in claim 17, wherein the annotation is adapted to be provided in the form of comments in at least one of the page description language and job control language, and wherein the printer processor is adapted to filter the comments in at least one of the page description language and job control language to extract the resource information needed to determine effective printer processor resource allocations.

19. A computer programmed to provide a document for printing by a printer, the document including current and subsequent pages, the programmed computer not being in the printer and having:

a first information processing structure to generate instruction data sufficient to cause the printer to print the document;

a second information processing structure to generate resource information derived from the instruction data and indicative of printer resources required by the printer to print at least one of the subsequent pages of the document, the resource information for at least one of the subsequent pages differing from the resources information of the current page and being on the current page; and an information path such that the instruction data and the resource information can be sent from the computer to the printer, the information path being such that the resource data for the at least one subsequent page is sent on the current page together with the instruction data required to print the current page to enable the printer to schedule resources for printing the document in response to the resource information.

20. A computer as claimed in claim 19, wherein the first information processing structure is arranged for generating instruction data as at least one of page description language and job control language.

21. A computer as claimed in claim 20, wherein the second information processing structure is arranged for (a) enabling resource information as annotation to at least one of the page description language and job control language, and (b) annotating the instruction data with the resource information.

22. A computer as claimed in claim 21, wherein the first information processing structure and the second information processing structure are combined in a common information processing structure.

23. A computer as claimed in claim 22, wherein the common information processing structure includes a printer driver.

24. A computer as claimed in claim 21, wherein said second information structure is located in the information path between the first information processing structure and a printer.

25. A computer as claimed in claim 24, wherein said second information structure includes a print spooler.

26. A computer as claimed in claim 24, wherein said second information structure includes a discrete structure for receiving the instruction data as input and for providing instruction data annotated with the resource information as output.

27. A computer as claimed in claim 21, wherein the second information structure is adapted such that the annotation is in the form of comments in at least one of the page description language and job control language.

28. A computer as claimed in claim 27, wherein the document comprises a first page and further pages subsequent in numbering to the first page and wherein the second information structure is adapted such that the resource information is provided as comments in page headers for the first page and the further pages in the page description language.

29. A computer as claimed in claim 28, wherein the second information structure is adapted such that the resource information is provided as comments in the page header to the first page of the document.

30. A computer as claimed in claim 28, wherein the second information structure is adapted such that the resource information is provided incrementally in a plurality of page headers.

31. A computer as claimed in claim 28, wherein the second information structure is adapted such that no resource information is provided as a comment to the page header of the first page.

32. A computer as claimed in claim 31, wherein the second information structure is adapted so as not to generate resource information for the first page of the document.

33. A computer system comprising a printer adapted to print a document from instruction data sufficient to cause the printer to print plural pages of the document with resource information derived from the instruction data indicative of printer resources required by the printer to print at least some of the plural pages of the document, the document including a current page and subsequent pages, the printer having a printer processor, the printer processor being arranged to schedule its resources for printing the different plural pages of the document from the instruction data in accordance with the resource information, and to print the document from the instruction data with the printer processor resources as scheduled; a computer programmed to provide a document for printing by a printer, the printer processor not being in the programmed computer, the programmed computer having a first information processing structure to generate instruction data sufficient to cause a printer to print the document and a second information processing structure resource to generate resource information derived from the instruction data and indicative of printer resources required by the printer to print at least one of the subsequent pages of the document, the resource information for at least one of the subsequent pages differing from the resources information of the current page and being on the current page, and an information path such that the instruction data for the at least one of the subsequent pages can be sent on the current page, together with the instruction data required to print the current page to enable the printer to schedule resources for printing the document in response to the resource.

34. In combination, a computer and a printer having a processor not included in the computer, the computer being arranged for supplying to the printer processor (a) instruction data sufficient to cause the printer to print the document and (b) resource information derived from the instruction data indicative of printer processor resources required by the printer at different document printing stages, the resource information at the different document printing stages differing from each other, the computer being arranged to provide to the printer processor the resource information as comments in page description language located in page headers for enabling the printer processor to learn, in advance of processing instruction data for a document printing stage, the printer resources required to process instruction data for that document printing stage;

the printer processor being arranged to schedule printer processor resources for different document printing stages in accordance with the resource information to prevent printer stalls, and to cause the printer to print the document with the printer resources as scheduled.

35. The combination as claimed in claim 34, wherein the instruction data includes page description language.

36. A method of operating a printer with a printer processor to print a document comprising supplying to the printer processor (a) instruction data sufficient to cause the printer to print the document and (b) resource information derived from the instruction data indicative of printer processor resources required by the printer at different document printing stages, the resource information at the different document printing stages differing from each other, the resource information being supplied as page description language located in page headers for enabling the printer to learn, in advance of processing instruction data for a document printing stage, the printer resources required to process instruction data for that document printing stage;

the printer processor scheduling printer resources for different document printing stages in accordance with the resource information to prevent printer stalls, and the printer processor causing the printer to print the document with the printer processor resources as scheduled.

37. The method as claimed in claim 36, wherein the instruction data includes page description language.

38. A method of printing a document from a computer with a printer, the printer having a printer processor, the method comprising:

generating, in the computer, instruction data that causes the printer to print plural pages of the document;

generating, in the computer, resource information indicative of printer processor resources required by the printer to print a current page and subsequent pages of the document;

sending the instruction data and the resource information required to print the current page and subsequent pages from the computer to the printer processor with the current page;

scheduling printer processor resources for the current page and subsequent pages of the document in accordance with the resource information sent with the current page; and printing the document with the printer processor resources as scheduled;

the document having a first page that forms the current page, the first page including as resource information a full timetable for scheduling of the printer processor resources.

* * * * *